Oct. 29, 1963 H. L. PROSSER 3,108,564
LAND-WATER TRANSPORTATION VEHICLE
Filed Dec. 26, 1961 3 Sheets-Sheet 1
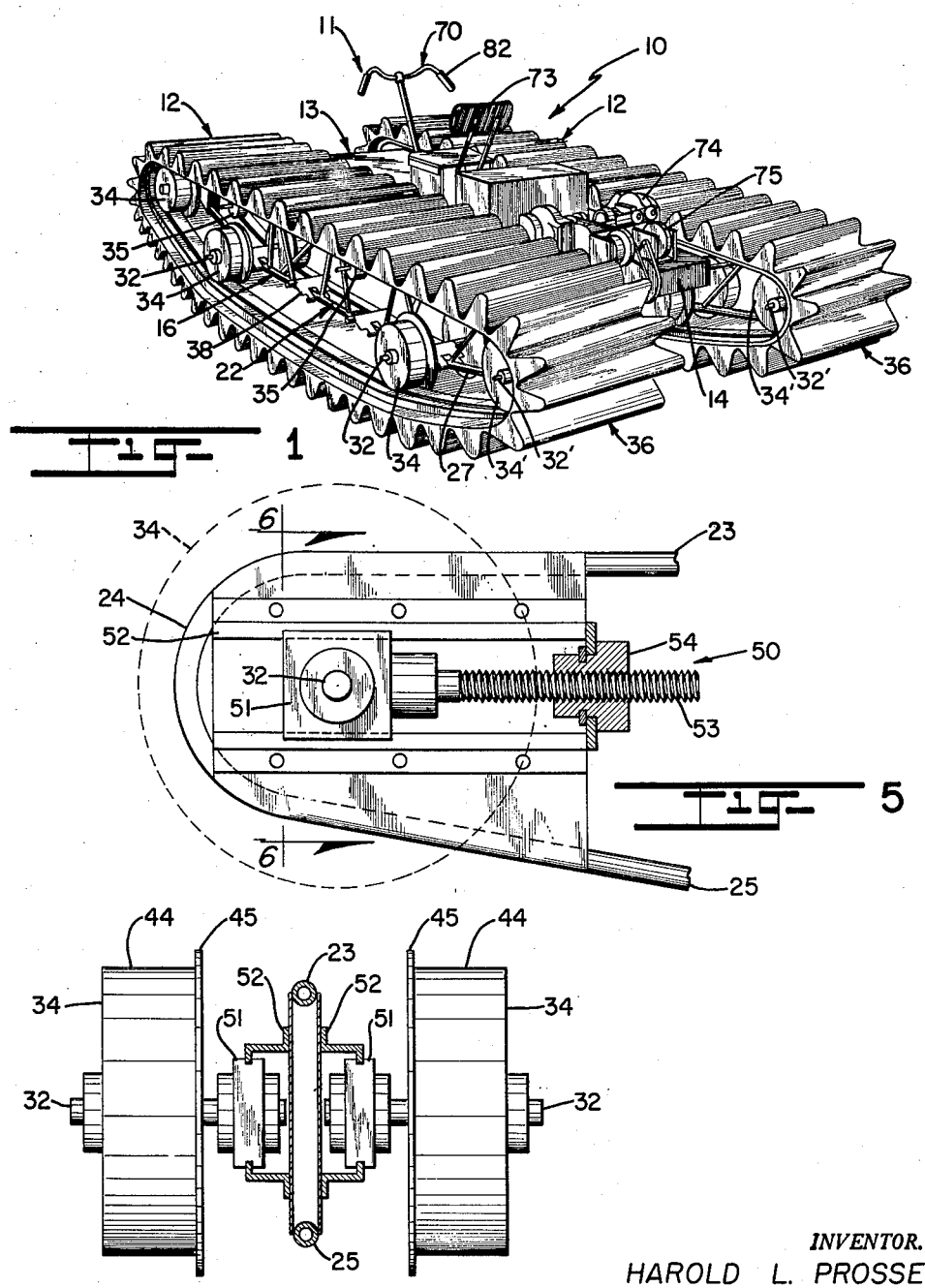
INVENTOR.
HAROLD L. PROSSER
BY
John E. Reilly
ATTORNEY Oct. 29, 1963    H. L. PROSSER    3,108,564
LAND-WATER TRANSPORTATION VEHICLE
Filed Dec. 26, 1961    3 Sheets-Sheet 2
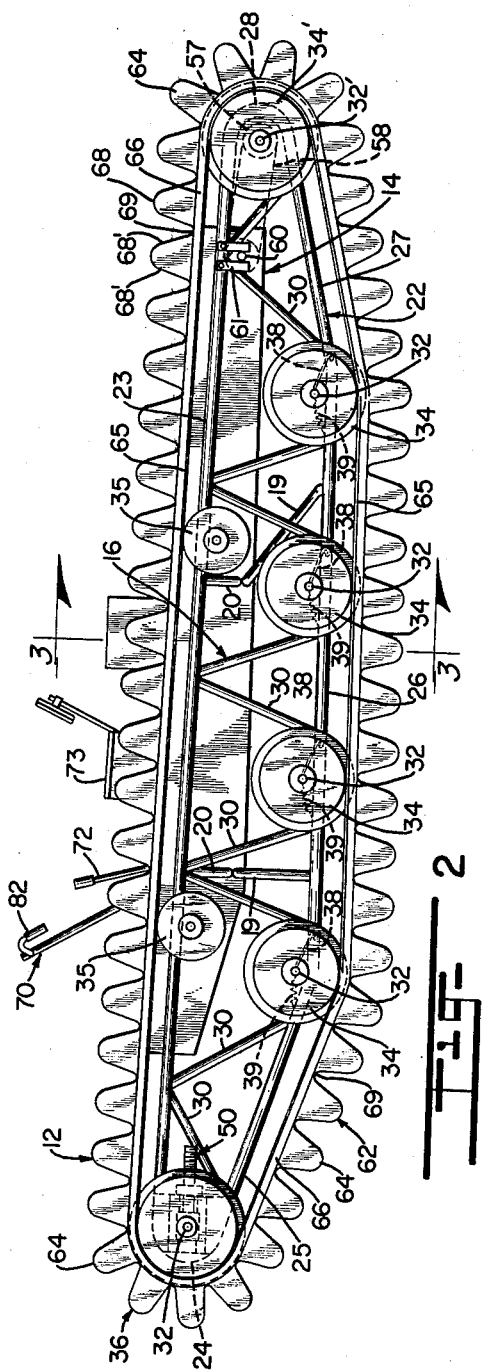
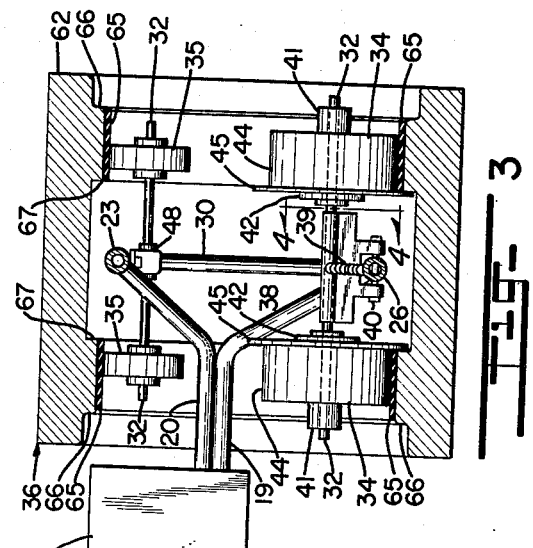
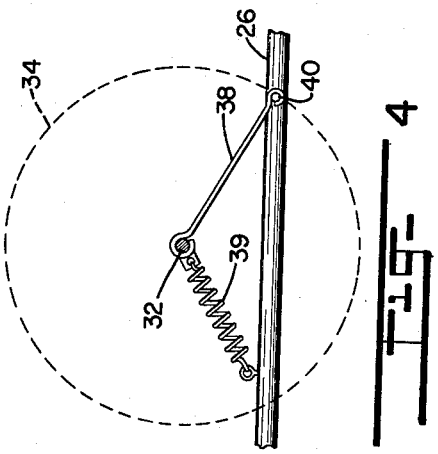
INVENTOR.
HAROLD L. PROSSER
BY
John E. Reilly
ATTORNEY

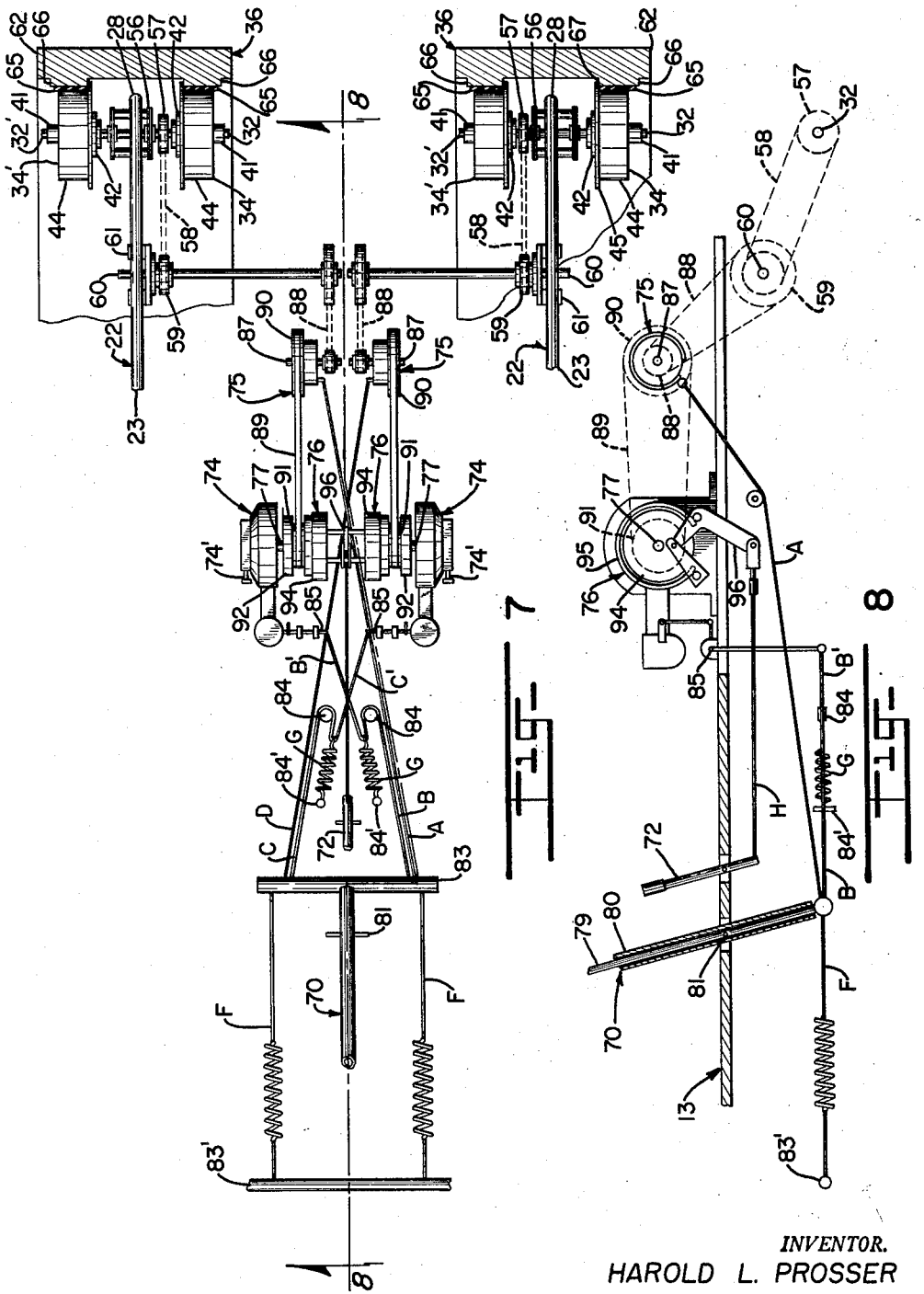

United States Patent Office 3,108,564
Patented Oct. 29, 1963

3,108,564
LAND-WATER TRANSPORTATION VEHICLE
Harold L. Prosser, Denver, Colo., assignor to Aqua-Trac Corporation, Denver, Colo., a corporation of Colorado
Filed Dec. 26, 1961, Ser. No. 161,906
13 Claims. (Cl. 115—1)

This invention relates to a new and useful vehicle or craft designed for use as a means of transportation on land or water; and, more particularly relates to a track-type transportation vehicle capable of self-propulsion along virtually any terrain, as well as on water and which in characterized by its high efficiency, high speeds of operation and good maneuverability.

In accordance with the present invention, it is a principal object thereof to make provision for a vehicle having an unusually high strength to weight ratio and load capacity, while being light enough to negotiate water, rough terrain, mud, ice, snow and steep grades at maximum efficiency; and yet, further to provide a vehicle which has maneuverability on water comparable to that on land.

It is a somewhat more specific object to provide a vehicle of the track type which is extremely lightweight in relation to its power and load capacity and which has incorporated therein a novel track designed to provide flotation, propulsion and good maneuverability in water, along with the necessary resiliency and compressibility for a soft-cushioned ride on land.

It is a further object to provide a vehicle capable of self-propulsion on land or water with substantially the same effectiveness and wherein the propelling force is developed in a unique manner through the use of a rugged, lightweight tread construction having extremely good wear and ride characteristics under all conditions of use; and moreover, whereby specifically the negative drag of the water is utilized to increase the speed of the craft in water in order to realize maximum efficiency.

It is a still further object of the present invention to provide a mobile land-water vehicle which in over-all construction and design has good equilibrium and balance in water or on land, enables the use of simplified controls, and is conformable for use in virtually any application as a means of transportation.

In accordance with the present invention, a track-type transportation vehicle has been devised which is capable of highly efficient self-propulsion, either on land or in water, through the utilization of a specially-designed track and tread construction. The latter are essentially in the form of elongate guide tracks on opposite sides of the vehicle having lower, relatively wide, horizontal courses, and correspondingly wide, endless tread portions which are trained over each track for advancement under the driving force supplied to the tracks. An important feature in this regard is that each tread preferably takes the form of a series of low density, interconnected segments or floats which when in contact with the water along the horizontal course of the truck are capable of displacing a substantially greater volume of water than the total dry weight of the vehicle. The treads are also designed to give highly efficient propulsion to the vehicle on land, snow or rough terrain as well as on the water and under all conditions provide excellent, cushioned ride characteristics. As will be apparent from the following description, the vehicle has innumerable applications, can be constructed in various sizes and forms and secures unusually good power and load characteristics for its extremely lightweight, low density construction.

The above and other objects, advantages and features of the present invention will become more readily understood from the following detailed description taken together with the accompanying drawings of a preferred embodiment thereof, in which:

FIGURE 1 is a perspective view of a preferred form of transportation vehicle;

FIGURE 2 is a side elevational view showing the relative disposition and arrangement of parts in the truck assembly portion of the vehicle;

FIGURE 3 is a view, partially in section, taken on line 3—3 of FIGURE 2 and more particularly showing the details of construction of the tread portion;

FIGURE 4 is an enlarged view taken on line 4—4 of FIGURE 3;

FIGURE 5 is an enlarged view of another portion of the roller assembly showing a typical form of take-up member usable in association therewith;

FIGURE 6 is a view, partially in section, taken on line 6—6 of FIGURE 5;

FIGURE 7 is a somewhat schematic showing of the drive mechanism employed, in accordance with the present invention; and FIGURE 8 is a side sectional view of the drive mechanism represented in FIGURE 7, and taken on lines 8—8 of FIGURE 7.

Referring in more detail to the drawings, there is shown a preferred form of transportation vehicle 10 adapted for self-propulsion on land or water and which is made up broadly of an intermediate drive control section 11 and spaced outer truck assemblies 12 flanking the section 11. A main frame or chassis 13 extends the substantial width of the vehicle in order to interconnect the sections 11 and 12 into a unitary structure and accordingly includes a central, generally rectangular enclosure 14 for the drive section and main support members 19 and 20 extend transversely through the housing and diverge outwardly at their ends for connection into truss sections 16. Additional supporting elements or bracing, not shown, can be employed at selected intervals between the truss sections, as required.

Each truck assembly is made up of an inner track and outer tread section, and in turn each track section has as its main supporting member the truss section 16. The truss section is specifically defined by an outer axle support member 22 in the form of a thick tubular rod which includes an upper horizontal portion 23 extending the length of the entire assembly, front curved end portion 24 continuing downwardly into an inclined portion 25, lower horizontal portion 26 and an inclined portion 27 terminating in the rearward closed end portion 28. The member 22 is rigidly interconnected by means of a series of angular braces 30 extending between the upper and lower portions thereof and at spaced intervals throughout. Each truss section serves primarily as a means of central support for a series of axles 32 mounted at spaced intervals thereon. Rollers 34 and 35 are journaled for rotation at opposite ends of each of the axles 32 to define in association with each truss section an oblong, double guide track for the purpose of carrying a wide, endless tread section 36 in driving engagement with the roller members. In the preferred form, a series of six, relatively large roller pairs 34 are spaced along opposite sides of each truss section, a pair of rollers 34 and 34' being journaled on axles 32 and 32' mounted within each curved end portion 24 and 28, respectively, and four pairs of rollers being spaced along the lower horizontal portion 26. Additionally, two pairs of upper, relatively small rollers 35 are journaled for rotation on axles secured to the underside of the upper horizontal portion 23 of the truss section.

The manner of interconnection between the rollers 34 and truss section is best seen from FIGURES 3 and 4 where it will be noted that the axles 32 are connected to the lower horizontal portion 26 through a yoke 38, which is spring loaded by means of a suitable spring 39, and the yoke is pivotally connected to the horizontal portion through a pivot pin 40. Actually, only the lowest four double rollers are spring loaded as described so as to provide a yieldable means of support for the tread section or, in other words, to effectively act as shock absorbers throughout the ground-engaging portion of the tread. Each roller includes a wide, generally cylindrical surface 44 and an enlarged circular rim 45 positioned at the inner end thereof to enable proper positioning and guidance of the tread section over the roller assembly. Bearings 41 and 42 serve to properly position the rollers 34 on each end of the axle in journaled relation thereto.

The front roller pairs are connected, along with axle 32, to the curved end portion 24 through a bearing take-up assembly 50, shown in FIGURES 5 and 6. The front axle 32 is mounted in a bearing 51 which is free to slide toward and away from the curved end portion 24 in a stationary bracket 52 connected within the curved end portion. A threaded take-up screw 53 extends rearwardly from the bearing 51 through a lock nut arrangement 54 so that inward and outward threading of the screw in relation to the lock nut will control the relative disposition of the bearing and axle in relation to the bracket. In this manner, the effective length of the entire double track portion can be controlled to compensate for any slack which may develop in the tread section in operation, although it will be apparent that various other means may be employed to suitably regulate the effective circumferential area of the double track portion in relation to the tread section.

The rear double roller assembly is located in stationary relation within the curved end portion 28 of the truss section and serves as the driver from the drive control section 11 of the vehicle, to be described. To this end, a main bearing 56, shown in FIGURES 7 and 8, interconnects the axle 32' and curved end portion 28, and a driven sprocket 57 is also mounted on the axle which is connected through chain 58 to drive sprocket 59 mounted on chain drive shaft 60. A pair of shafts 60 are provided, each connected by means of a bracket 61 into the upper horizontal portion 23 of the truss section. The roller members 34' are of course keyed for rotation with the drive axle 32' and thus define the prime mover for each truck assembly.

An important feature of the present invention resides in the construction and design of the tread section 36 which as the propelling mechanism for the vehicle will, both when propelled and motionless, provide the necessary flotation or buoyancy to support the vehicle almost completely out of the water. More important, when in motion across the water, negative drag of the water, normally a hindrance, will actually lend itself to the motion of the vehicle, rather than to retard its rate of speed or motion, and to such an extent that the vehicle has substantially the same work efficiency in water as on land. The same characteristics make possible the effective utilization of the vehicle for travel over rough terrain, mud, ice, snow and excessive grades, along with excellent maneuverability over such terrain as well as on the water. Accordingly, the tread section is comprised essentially of an endless body 62 of low density, rugged material including a series of relatively wide and deep, transversely extending, surface-engaging segments 64 and a pair of spaced drive or flat belts 65 molded or otherwise permanently adhered to shoulders 66 on the underside of the body. The spacing of the shoulders 66 and drive belt 65 is such as to correspond with the spacing between rollers 34 and 35, as seen best from FIGURE 3, and where edge surfaces 67 formed by the belts 65 and shoulders 66 will ride against the rim part 45 of the rollers to prevent any lateral misalignment or slippage of the tread in relation to the rollers when in motion.

For a proper understanding of the present invention, it is important to recognize the various features and requirements fulfilled by the tread section in relation to the over-all design and construction of the vehicle. First, in composition, the tread section must have good wear and water-resistant characteristics, and also have the necessary flexibility or resiliency to stretch around the curved ends of the track assembly then to assume its original shape as it passes along the lower course of the track assembly, while also having the desirable attribute of providing a smooth, cushioned ride. In addition, to provide the necessary buoyancy or flotation to the vehicle, the tread is most desirably formed or composed of a low density or lightweight material which possesses the aforementioned characteristics so that at the area of contact between the tread section and the water, it will be capable of displacing a greater volume of water than the dry weight of the vehicle itself. In other words, for a given weight of the vehicle including the tread section, this weight per volume displacement of water by the area of the tread section contacting the water must be less in density than the density of the water so that the buoyancy of the water will overcome the weight of the vehicle and support it at the water surface. To accomplish these ends, various materials have been found entirely satisfactory and of course, a great number of rubber, synthetic rubber and rubber-like plastic materials have these necessary characteristics. Polyethylene foam and other foam plastics have been found to be ideally suited for this purpose and in fact, the preferred form is representative of a molded tread section composed of polyethylene foam. In addition, inflatable rubber and rubber-like materials have also been found to be entirely satisfactory due to their low density in relation to their high volume displacement capacity.

Equal consideration must be given to the design and construction of the tread section. Although density of the material is an important factor, it is important only insofar as the entire weight of the vehicle is concerned and, due to the greater concentration of weight in the chassis and drive mechanism sections, the tread section must be so formed as to operate efficiently and establish a sufficiently large area of contact with the water such that the weight per cubic foot of the vehicle in contact with the water will be considerably less than the weight per cubic foot or density of water. Here, a substantial difference in density should be provided for in order that the vehicle will be capable of carrying large loads or a number of persons if desired with little or negligible effect. In design, an extremely high total area displacement is built into the track and tread section along the lower course thereof, engaging the ground or water surface, by designing the truss and roller assemblies to be relatively long, flat and of a substantial width; and additionally, to have a lower course which is completely, or substantially so horizontal as for instance along the horizontal portion 26 of the truss section. In addition, the inclined portions 25 and 27 are sloped at a low angle to lower the entire silhouette of the track sections so that even with some submergence of the vehicle in the water along the tread portion, the area of contact will rapidly increase as the inclined portions move into contact with the water. Further, along with the substantial width of the tread sections, they are given a substantial thickness as well so that only the tread section, as the propelling force, will remain in contact with the water. Moreover, on land surfaces, the increased thickness of the tread sections will provide better cushioning and compressibility for the entire vehicle, particularly at high rates of speed.

Another important factor in design is to establish the necessary positive engagement with the ground or water surface to make the vehicle highly mobile and easily self-propelled at maximum efficiency. Also, since negative drag is a favorable factor in construction of the tread section, the outer surface engaging portion of the tread section should be formed so as to produce maximum drag for example of the type that would be produced using paddles or oars in the water for greatest water displacement. To this end, the outer segments 64 are extended transverse to the length of the vehicle and in the preferred form are defined by a series of spaced cogs or ribs having outer curved surfaces 68 and straight sides 68' which are spaced apart by relatively deep, semi-circular grooves 69. The grooves 69 not only lend increased flexibility to the cogs as they pass over the curved end portions and move into engagement with the ground surface but also increase the area of positive contact between the cogs and the water so that the cogs act as paddles in the water with high water displacement characteristics. It will be understood in this connection that the segments 64 may also take the form of other tread designs such as lugs or cleats projecting outwardly from the body of the tread section to establish positive engagement with the ground or water surface. Special wear strips, not shown, may also be applied to the outer surfaces 68 in order to protect the cogs and provide increased frictional engagement.

For the purpose of illustration and not limitation, the tread width and length can be easily calculated from a determination of the over-all vehicle weight. Assuming that the gross dry weight of the vehicle is on the order of 500 lbs., then the necessary area of displacement by the lower area of contact between the tread sections and water will be on the order of 8 cubic feet, determined by dividing 500 lbs. by the water density. Thus, the tread area in contact with the water must provide at least 500 lbs. flotation and the actual volume displacement of water must be equal or greater than this amount. Accordingly, two tread contact areas 6" deep, 27" wide, 10' in length would provide over 14 cubic feet in displacement, multiplied by the density of water, or 880 lbs. flotation. Here, use of a low density material such as polyethylene or polyurethane foam having a density more on the order of 2-3 lbs. per cubic foot will be capable of providing a large volume water displacement in relation to its weight and more than make up for the more concentrated areas of weight in the vehicle. Thus, over and above the 500 lb. weight of the vehicle, it would be capable of carrying 380 lbs. extra weight while having the necessary buoyancy to keep it afloat. Moreover, should the tread contact area sink into the water nevertheless the contact area and displacement volume of water will correspondingly increase as mentioned.

The drive control 11 is positioned on the central enclosure 13 in raised or elevated relation to the truck assemblies and, at the outset, it is emphasized that the drive mechanism employed may assume any conventional form with the desirable feature of being simplified and lightweight so as not to unduly increase the over-all weight of the vehicle. In the preferred form, the section 11 is designed so that the entire operation of the vehicle including that of starting, stopping, turning, reversing and accelerating is controlled by control members 70 and 72 easily accessible from the driver's seat 73. Referring in detail to the drive mechanism, separate drive units for each track assembly are mounted toward the rear of the section and each drive unit consists of a motor represented at 74, brake control mechanism 75 and a reverse control 76 mounted on motor drive shaft 77. The main control stick 70, as best seen from FIGURES 7 and 8, is in the form of a pair of inner and outer concentric shafts 79 and 80, respectively, the outer shaft being pivoted as at 81 for movement in a forward and reverse direction and the inner shaft 79 being free to rotate in relation to the outer shaft, there being a handle or steering control 82 at the top of the inner concentric shaft. A lower cross bar 83 is connected to the bottom of the inner shaft within the housing 13 having four cables A, B, C and D extending in criss-cross relation rearwardly from the cross bar to the drive mechanism; also, a cable-spring assembly F extends forwardly from the center of the cross bar for attachment to a plate 83'. Inner cables B and C on either side of the shaft are looped around pulleys 84 and secured by spring G to a mounting plate 84' within the enclosure, and separate cable lengths B' and C' are clipped to the respective cables and connected into throttle controls 85. Outer cables A and D are connected directly into the brake drum to control engagement and release of the brake shoes, not shown, in the brake mechanism. Forward movement of the control stick 70 will permit the cables A and D to move rearwardly, or to slacken, in order to release the brake shoes; whereas, the cables B and C into the throttle controls will upon rearward movement and under the urging of the springs G move the throttle controls toward the open position, thus to speed up the motor drive. Conversely, pulling the control rearwardly will have just the opposite effect so that the brake shoes will be forced into engagement with the brake drum as the throttle controls are moved toward the closed position. The brake mechanism 75 for each drive unit is mounted on a brake shaft 87 having a sprocket and chain drive 88 passing rearwardly for interconnection with the drive shaft 60; also, a drive belt 89 is trained over a pulley 90 on the brake shaft and over a special pulley 91 on each motor drive shaft. In this way, the speed of rotation of the motor is transmitted to the brake shaft and chain drive 88 to the drive shaft 60 for each track section. The drive pulley 91 on the motor drive shaft is illustrated as being in the form of a reversible transmission, with centrifugal clutch, such as, model 14-180-001 manufactured by Fairbanks-Morse. The pulley houses a centrifugal clutch 92 on one side whereby when the shaft 87 is braked, along with the drive pulley 91, the motor drive shaft will become free wheeling and will slow to a gradual stop. A planetary gear assembly acts as the reverse control, 76, which is housed in the opposite side of the pulley and actually forms a part of the reversible transmission. The assembly includes a control drum 94 journaled on the shaft 77, an outer control band 95 and an arm 96. The arm and control band are operated by a reverse control cable H secured to the reverse control lever 72, which is pivotally secured into the floor of the enclosure 13 in a manner similar to the main control stick 70. When the vehicle is in motion, the band 95 will remain out of engagement with the control drum so that the planetary gear system will merely follow the movement of the shaft 77 and transmit this motion into the drive pulley 91. However, when it is desired to reverse the drive mechanism, the control stick 72 is pulled rearwardly to force the cable forward whereupon the control arm 96 will pivot to urge the band into positive engagement with the drum 94, so as to cause rotation of the drive pulley 91 in a direction opposite to that of the drive shaft, and this reverse motion will be imparted, through the brake shaft and chain drive, to the roller drive assembly. Here, the motor unit 74 is conventional and for example may be a two-cylinder unit having a manual starter 74', such as, the model H82 unit manufactured by Tecumsah Power Products of Grafton, Wisconsin.

It is believed the operation of the vehicle will become apparent from the foregoing description. The manner of starting, stopping, forward and reverse motion of the vehicle has been described and in this relation, the forward control cable will normally hold the separate cables A—D in the braked position. In addition, steering is controlled through the handle 84 whereby turning the inner shaft 79 in a clockwise direction will release the right-hand cables C and D to accelerate the left-hand drive unit, whereas the left-hand control cables A and B will brake the opposite, right-hand drive unit thereby to cause turning to the right. Opposite turning of the inner shaft in a counterclockwise direction will cause just the reverse operation of the drive units and a consequent turning to the left. Each tread section is driven individually through its respective drive unit whereby the rear drive roller assemblies will engage the flat belts 65 causing advancement of the entire tread section over the rollers. The take-up roller assembly at the front end can be suitably regulated as described after the vehicle has been in operation to remove any slack from the tread section and insure non-slipping engagement between the rollers and treads. Accordingly, forward advancement of the treads over the rollers will cause corresponding advancement of the entire vehicle as the outer segments of the treads move into engagement with the ground surface. In this relation, the vehicle can serve as a means of transportation for virtually any desired application, either on land or on water. In the water, the buoyancy of the vehicle is such that the water level can be held to a point substantially at the area of engagement between the treads and the lower rollers 35 mounted on the horizontal portion 26 of the truss. In addition to the resiliency and compressibility of the body of the tread section, the spring-loaded arrangement of the lower roller assemblies will permit the vehicle to withstand a great deal of shock and provide a smooth, comfortable ride for its occupants or any load placed on the vehicle. Most desirably, the center of gravity of the vehicle is at a point behind the driver's seat 73 so as to balance the weight of the driver and other occupants. In this relation, the vehicle will be self-balancing in the water and maintain a high degree of equilibrium due to its flat, elongate configuration.

When in the water, as stated, the vehicle will be supported above the water by the propelling mechanism or tread section throughout its lower area of contact, and when propelled will continue to be supported above the water due to the buoyancy of the tread sections so that the sole contact with the surface of the water is along the lower course of the track sections. Thus, the negative drag of the water is a favorable factor in causing forward advancement of the vehicle, and as a result, flotation problems, negative drag, weight of the vehicle and the controls have been designed such that the vehicle will provide maximum pay load versus weight ratios, with maneuverability in water practically equal to that on land. Also, the vehicle is conformable for use in various sizes and weights for a number of applications, both military and commercial and is believed to provide transportation in size and weight capacities far in advance of anything now available. Typical applications of the vehicle of the present invention would be as a space capsule recovery vehicle, an amphibious shore patrol vehicle or for various military communications and utility service transport uses. Commercially, the vehicle has outstanding characteristics which would make it very desirable to use in ski lift or other snow patrol operations, since the vehicle due to its extremely low density and wide contact area would freely ride over the snow and is capable of negotiating very steep grades. Similarly, the vehicle has desirable characteristics which would favor its use in commercial boating operations, either as a means of transportation or hauling or water skiing. Here, its over-all adaptability and conformability for use on land or in the water permits all-around use to serve virtually any transportation need.

It is further to be understood that various modifications and changes may be made in the construction and arrangement of parts comprising the vehicle, particularly in the drive control mechanism, without departing from the scope of this invention as defined by the appended claims.

What is claimed is:

1. A track-type vehicle capable of self-propulsion on land and water comprising a chassis, tread support members connected to opposite sides of said vehicle, each including a series of rotatable members defining a generally oblong track having a lower substantially horizontal course extending through the length of said vehicle, drive means on said chassis drivingly connected to at least one of said rotatable members in each tread support member, and an endless, relatively wide tread section trained for advancement around each tread support member, each tread having an endless drive belt in drive-contacting relation with said rotatable members and an outer relatively thick, compressible section of low density, the outer section including transversely extending segments each of convex cross-sectional configuration serving as land-water engaging surfaces, and said tread sections together providing when in contact with the water an area of contact along their lower courses capable of displacing a volume of water greater in weight than the total dry weight of the vehicle.

2. A track-type vehicle according to claim 1, said outer section being composed of polyethylene foam, and each segment having an outer convex ground engaging surface and straight sides terminating in a relatively deep groove adjacent said drive belt.

3. A track-type vehicle according to claim 1, said tracks being relatively long in relation to said chassis, and the lower course of each track including an intermediate horizontal portion and end portions inclining at a low gradual angle away from the horizontal portion.

4. A track-type vehicle according to claim 1, said tread support members each being defined by a series of axles for said rotatable members with means centrally supporting said axles in a generally oval-shaped pattern, and said rotatable members being in the form of roller pairs, each pair being journaled for rotation on opposite ends of each axle to form a double track on each side of said chassis.

5. A track-wide vehicle according to claim 4, said tread support members each being defined by a vertical truss, axle-mounting arm members including shock absorbers for each axle mounting member along the lower course of the truss, and tension adjusting means to take up the slack between the treads and rollers.

6. A track-type vehicle according to claim 1, said drive means comprising a drive control unit for each tread section, each drive unit having a motor including a drive shaft drivingly connected to at least one rotatable member, a braking mechanism and reversing mechanism operably connected to each motor drive shaft, and operator control means for said drive means including control lines extending to said motor, braking and reverse mechanism for correlated control of the speed, direction of movement and braking of said vehicle.

7. In a track-type vehicle adaptable for self-propulsion on land and water, a track assembly comprising a generally oblong tread support section having a lower generally horizontal course, an outer endless tread section being trained for advancement over said tread support section, said tread section including relatively wide and deep, outwardly projecting ribs composed of a low density compressible material, said ribs defining when in the water an area of contact along the lower course of said track assembly capable of displacing a volume of water greater in weight than the dry weight of said vehicle.

8. In a track-type vehicle according to claim 7, said ribs being of generally convex cross-sectional configuration extending transversely of the length of said tread section.

9. In a track-type vehicle according to claim 7, each of said ribs being composed of a plastic foam material.

10. In a track-type vehicle according to claim 7, said ribs having outer convex ground-engaging surfaces and straight sides terminating in relatively deep grooves between said ribs.

11. In a track-type transportation vehicle adapted for self-propulsion on land and water, a track assembly comprising a series of rotatable tread support members, means mounting said rotatable members to define an oblong track having a lower generally horizontal course, an endless tread section composed of a low density material defined by an inner continuous body portion and a series of outwardly projecting transversely extending ribs trained for advancement over said rotatable members, and said tread section being of a width and depth to form an area of contact along the lower course of said track assembly capable of displacing a volume of water greater in weight than the dry weight of said vehicle.

12. In a track-type transportation vehicle according to claim 11, each of said rotatable members having roller pairs, each of said roller pairs being mounted for rotation on a common transverse axis, said body including a pair of inwardly directed longitudinally extending shoulders aligned with each of said roller pairs, and drive belts disposed on the under surface of said shoulders in drive-contacting relation with said roller pairs.

13. A track-type vehicle adapted for self-propulsion on land and water comprising a chassis, tread support means connected to opposite sides of said chassis and each tread support means including a series of rotatable members defining a generally oblong track having a lower substantially horizontal course, drive means on said chassis operatively connected to at least one of said rotatable members in each tread support member, and endless, relatively wide tread sections composed of low density material trained for advancement around each of said tread support means, each tread section including an inner continuous body portion in drive-contacting relation with said rotatable members and a series of outwardly projecting, surface-engaging ribs defining when in contact with the water an area of contact along the lower courses of said tread support means capable of displacing a volume of water greater in weight than the total dry weight of the vehicle.

References Cited in the file of this patent
UNITED STATES PATENTS

| | | |
|---|---|---|
| 2,308,327 | Darragh | Jan. 12, 1943 |
| 2,546,523 | Reynolds | Mar. 27, 1951 |
| 2,860,593 | Laycock | Nov. 18, 1959 |
| 3,017,942 | Gamaunt | Jan. 23, 1962 |